United States Patent [19]

Tomic

[11] Patent Number: 4,758,278
[45] Date of Patent: Jul. 19, 1988

[54] MAGNESIUM OXIDE POWDER FOR WORKABLE, RAPID-SETTING PHOSPHATE-CONTAINING CEMENT COMPOSITIONS

[75] Inventor: Ernst A. Tomic, Wilmington, Del.

[73] Assignee: E. I. Du Pont De Nemours and Company, Wilmington, Del.

[21] Appl. No.: 936,106

[22] Filed: Nov. 28, 1986

[51] Int. Cl.$^4$ ............................................. C04B 12/02
[52] U.S. Cl. ....................................... 106/85; 106/121; 106/459
[58] Field of Search ........................... 106/85, 121, 306

[56] References Cited

U.S. PATENT DOCUMENTS

| | | | |
|---|---|---|---|
| 2,450,952 | 10/1948 | Greger | 106/121 |
| 2,466,138 | 4/1949 | Wainer | 106/85 |
| 3,821,006 | 6/1974 | Schwartz | 106/85 |
| 3,879,209 | 4/1975 | Limes et al. | 106/85 |
| 3,923,534 | 12/1975 | Cassidy | 106/85 |
| 4,152,167 | 5/1979 | Horvitz et al. | 106/85 |
| 4,394,174 | 7/1983 | Tomic | 106/85 |

Primary Examiner—Steven Capella
Attorney, Agent, or Firm—James T. Corle

[57] ABSTRACT

A storable magnesium oxide/phosphate based cement having a delayed set time is provided by heating iron-containing magnesium oxide particles at an elevated temperature to provide magnesium ferrate in a gradient that increases to a maximum at the external particle surface.

7 Claims, No Drawings

MAGNESIUM OXIDE POWDER FOR WORKABLE, RAPID-SETTING PHOSPHATE-CONTAINING CEMENT COMPOSITIONS

BACKGROUND OF THE INVENTION

1. Field of the Invention

The present invention relates to magnesium oxide (MgO) powder adapted for use in phosphate cements which provide rapid-setting compositions, and more particularly to cements containing magnesium oxide powder adapted to be used in hardenable phosphate compositions which set rapidly after a lead time of sufficient length to allow the composition to be worked, placed and finished.

2. Description of the Prior Art

Cements are particulate materials that set up and harden to strong, dense monolithic solids upon being mixed with a liquid and allowed to stand. Cements find utility in many areas of commerce, especially in the construction industry, where they are often used in conjunction with various aggregate materials to form such articles as concrete slabs, panels and pillars, masonry binders and floorings. Rapid-setting cements are advantageous not only in new but especially in rehabilitative construction applications such as road patching, resurfacing floors, and repairing masonry.

The technology relating to quick-setting inorganic cements has been focused largely on phosphate systems in which a basic component, usually magnesium oxide, reacts with phosphoric acid or a salt thereof in the presence of water. One of the problems encountered with this system is that such compositions set too rapidly to enable the user to comfortably place them by pumping, pouring, trowelling, etc.

U.S. Pat. No. 4,394,174 describes cement products and rapid-setting compositions made therefrom, containing magnesium oxide and aluminum phosphate, which compositions are revealed to be workable for a length of time, i.e., at least ten minutes, sufficient, for example, to allow them to be comfortably mixed and finished. Thereafter the compositions are said to harden quickly, e.g., within one hour, at which time, for example, vehicular traffic can be allowed to pass over a road repair patch. The required prolonged working time of these compositions is achieved by retarding their set time by controlling the concentration, particle size, and the surface area of the magnesium oxide in a manner such that the peak of the exotherm is reached after about a ten-minute interval.

U.S. Pat. No. 4,152,167 describes a dry matrix-forming composition containing magnesium oxide, ammonium phosphate, and a polyphosphate which can be admixed with aggregate or filler material to provide a product that sets to form a solidified mass when mixed with water. The composition, when mixed with water, is said to be readily workable prior to setting, although the exemplified mixtures remained fluid for only 1 to 8 minutes.

U.S. Pat. No. 3,879,209 describes a process for making quick-setting cements based on magnesium oxide and a solution containing ammonium polyphosphates. These cements are said to "set hard" within a few minutes, generally about 45 minutes.

It has been found that magnesium oxide/phosphate rapid-setting compositions of the type described above may be inconsistent in their working times if a low-purity magnesium oxide, e.g., dead-burned magnesite, is present therein. Considerable variations in working time have been observed in compositions made with a low-purity dead-burned magnesite containing about 87% magnesium oxide when the magnesite, $MgCO_3$, although consistently of the same grade designation and particle size distribution, has been received in different shipments from the same supplier. Such variations have been encountered even in compositions in which the concentrations of the components and the surface area and particle size of the magnesium oxide have been carefully controlled to provide acceptable working times. As a result, in many instances the working time is too short. Inasmuch as it is economically advantageous to use low-purity magnesium oxide in phosphate cements, a means is needed for providing a consistent adequate working time in rapid-setting compositions made from phosphate cements containing low-purity magnesium oxide.

SUMMARY OF THE INVENTION

The present invention provides a powder consisting essentially of magnesium oxide particles which contain from about 0.1% to about 7.5% and preferably from about 0.25% to 5% by weight magnesium ferrate in a gradient concentration that increases to a maximum near the external surface of the magnesium oxide particles. This invention also provides a cement product containing the magnesium oxide particles of the invention in combination with a phosphate, preferably aluminum phosphate, and/or with phosphoric acid, ammonium and sodium phosphates, and/or polyphosphates, and rapid-setting compositions containing the cement product, in mixture with water. Rapid-setting compositions containing this magnesia product have delayed set times which are considerably longer than those which can be achieved with magnesium which do not contain magnesium ferrate, i.e., $MgFe_2O_4$, "ironspinel."

The magnesium oxide powder of the invention is made by a process, also provided by this invention, which comprises heating magnesium oxide particles containing internal ferric oxide ($Fe_2O_3$), e.g., ground dead-burned magnesite containing ferric oxide as an incidental impurity in amounts as high as 10% but generally less than about 5% by weight, at a temperature of at least about 600° C., and preferably at least about 800° C., for a length of time sufficient for ironspinel, $MgFe_2O_4$, to form and become concentrated in the outer layers of the magnesium oxide particles. Generally, at least one hour of heating is necessary, with three or more hours being preferred when temperatures nearer the minimum are employed.

The end result of the present process is not merely that of a reaction between the magnesium oxide and the internal ferric oxide to form the ironspinel, but an apparent fortuitous migration of the unreacted or reacted ferric oxide toward the surface of the particle so that the ironspinel, rather than being scattered more or less evenly throughout the particle, as the ferric oxide in the initial powder appears to be, finds itself concentrated in the near-surface and surface zones, thereby rendering the particle more slowly reacting in its outer ironspinel-rich zones and more rapidly reacting in the internal region. This causes the powder to produce phosphate compositions having an adequate working time, i.e., while the ironspinel-rich outer zone reacts, and a subsequent rapid set while the internal magnesium oxide reacts. Moreover, the working time of the ironspinelbearing magnesium oxide particles of the invention is not characterized by the large variations heretofore encountered with a given grade of low-purity, dead-burned magnesite from different shipments.

DETAILED DESCRIPTION

The magnesium oxide powder used as the starting material in the present process may be ground, dead-burned magnesite ($MgCO_3$) containing about from 85 to 99% magnesium oxide plus incidental impurities including at least about 0.1% ferric oxide. Available commercial grades are manufactured either from ores such as magnesite or from aqueous solutions of magnesium salts such as magnesium chloride. Magnesium chloride is first precipitated with limestone, and the resulting magnesite is briquetted. Magnesite chunks from crushed ore or magnesite briquettes from magnesium chloride are then converted to magnesium oxide, predominantly in the form of periclase (cubic magnesium oxide) in a kiln, then ground and screened prior to shipment. Often conversion to dense periclase is not complete which leaves zones of less dense magnesium oxide, the exact nature of which is unknown but which is known to be more reactive than the predominantly dense periclase. On mixing of the magnesium oxide-containing cement ingredients, the phosphates first react with the less dense, more reactive magnesium oxide. Heat of the this reaction then accelerates the reaction with the phosphates with the bulk of the magnesium oxide in the cement and leads to its premature setting.

Examples of dead burned or refractory magnesium oxides of commerce used in the present process are listed in Table I which gives their chemical analysis and screen sizes.

TABLE I
CHEMICAL AND SCREEN ANALYSIS OF REFRACTORY GRADE MAGNESIUM OXIDES OF COMMERCE

| % | A | B | C | D | E | F |
|---|---|---|---|---|---|---|
| MgO | 87.0 | 87.0 | 90.0 | 96.0 | 98.2 | 87.0 |
| $SiO_2$ | 4.6 | 4.6 | 4.8 | 0.8 | 0.4 | 4.5 |
| CaO | 4.2 | 4.2 | 1.8 | 2.3 | 0.8 | 4.0 |
| $Fe_2O_3$ | 2.7 | 2.7 | 1.3 | 0.4 | 0.2 | 3.0 |
| $Al_2O_3$ | 1.2 | 1.2 | 1.8 | 0.2 | 0.1 | 1.5 |
| +10 mesh | 0.6 | 0 | 0 | 0 | 0 | 0.7 |
| +16 mesh | 10.0 | 0 | 1.3 | 0.4 | 0 | 1.1 |
| +20 mesh | 16.5 | 0 | 3.7 | 1.7 | 0.1 | 1.2 |
| +50 mesh | 37.1 | 0.1 | 8.6 | 33.3 | 0.2 | 9.5 |
| +100 mesh | 12.6 | 3.5 | 8.2 | 25.8 | 2.4 | 15.0 |
| +200 mesh | 9.2 | 19.1 | 20.4 | 15.1 | 7.6 | 23.8 |
| +325 mesh | 4.5 | 21.8 | 17.7 | 7.4 | 11.6 | 13.1 |
| remained on pan | 9.5 | 55.5 | 40.1 | 16.3 | 78.1 | 35.6 |

Of the magnesium oxides listed in Table I, A, B, and C were produced from magesite ores. A and B are different particle size distributions of the same domestic ore, C was of overseas origin. Magnesium oxides D and E were produced from sea water and F from underground brine. Depending on their origin, these magnesias contained from about 2 to about 13% of the listed impurities.

Chemical analysis gives only the concentration of impurities. Analysis by x-ray diffraction (XRD) permits identification of their mineralogical properties. For example, XRD shows that samples A and B (Table I) contained Ca and Si in the form of Monticellite ($MgCaSiO_4$) and Al as spinel ($MgAl_2O_4$). No iron mineralization was detected notwithstanding the relatively high level of iron when compared to aluminum. This implies that the iron was present in amorphous form.

As will be described more fully in the following examples in which parts and percentages are by weight unless otherwise specified, measurements made on the ground, dead-burned magnesite with an ion scattering spectrometer reveal a uniform distribution of iron in the outer portion of the particles over a depth of at least about 200 A.U. Also, the x-ray diffraction pattern of this powder shows no peak indicative of a spinel structure.

As previously stated, the magnesium oxide powder of this invention may be obtained by heating iron-containing ground, dead-burned magnesite, for example, any of those listed in Table I, to a temperature of at least about 600° C., and preferably to at least about 800° C., for a sufficient length of time to allow the ferric oxide impurity to react with the magnesium oxide to form an iron-spinel, $MgFe_2O_4$, and concentrate the ironspinel at the particle's surface. At temperatures below 800° C., a duration of heating of at least about three hours may be required for the ironspinel outer layer to form, whereas one to two hours may suffice at the 800° to 950° C. level. A preferred heating time, even at the higher temperatures, is about three hours. Temperatures greater than 950° C. do not appear to be required and, in any case, are difficult to attain by conventional techniques. After heat treatment, the magnesium oxides in Table I appear darker in color. For example, A changed from tan to reddish-brown and E from off-white to tan in color. Chemical analysis showed that the concentration of Si, Ca, Fe, and Al had not changed as a result of the heating step. XRD, however, showed that mineralization had undergone major changes as a result of the heat treatment. Besides Monticellite already present in the starting magnesium oxide, a new mineral, ironspinel, which was not detected in the starting material, appeared in the heat-treated product. Moreover, it had become the major impurity mineral, being present in concentrations greater than Monticellite as shown by the relative intensities of the XRD peaks. Essentially all of the iron oxide was converted to ironspinel.

Because the ironspinel in the product is required to be concentrated in the surface layers of the magnesium oxide particles, post-grinding of the powder should be avoided. For this reason, the present process is applied to a powder which has already been ground to the particle size useful for rapid-setting cement products, generally powders ranging in particle diameter from less than 44 micrometers to about 2000 micrometers.

A preferred embodiment of the present invention is a storable dry cement comprising a mixture of components (a) and (b) which are adapted to react together when the components are combined with aggregate and water. In this dry-mix product, component (a) a magnesium oxide containing magnesium ferrate prepared as previously described, may be present in an amount from about 2 to 27 parts by weight, and component (b), an inorganic salt of phosphoric acid may be present in an amount from about 5 to 20 parts by weight. Components (a) and (b) may be combined with from about 40 to 90 parts by weight of sand and/or gravel aggregate. In another embodiment from about 2 to 25 parts by weight of fly ash may be included in the dry mixture.

EXAMPLE 1

The following experiments show that the set time of magnesium oxide/aluminumphosphate cements is extended by heating the magnesium oxide ingredient of the cement to 935 plus/minus 15° C. for three hours prior to its incorporation in the cement composition.

To determine the set time of the cements the following procedure was used: 15 grams (5%) of the magnesium oxides listed in Table I were intimately blended with 75 grams (25%) of fly ash (which complied with ASTM C 618-83 Class C) and with 150 grams (50%) silica sand (which complied with ASTM C 144-81) in a 400 ml polyethylene beaker. Next 60 grams (20%) of a 50% aqueous solution of $Al(H_2PO_4)_3$ was added, and the resulting slurry was thoroughly mixed for one minute with a 32 mm "JIFFY" mixer (Jiffy Mixer Co., Inc., 1342 Bell Avenue, Tustin, Calif. 92680-6467) at about 600 rpm. The contents of the beaker was then poured into a common 8 oz (240 ml) styrofoam cup (about 90 mm tall, with 80 mm top and 45 mm bottom diameters). The cup's insulating properties and disposable nature made its use practical. The cup containing the cement slurry was then placed on Modified Vicat Apparatus (which complied with ASTM C 359 from Forney Inc., R.D.#2, Rt. 18, Wampum, Pa. 16157-9309). The apparatus was equipped with a 1 mm diameter needle and a 300 gram plunger. The cement was tested at room temperature (25° C. but without controlling the temperature of the sample) for penetration by the needle. The time of liquid addition to the solids blend to the time at which the needle penetrated by 1 mm or less into the cement paste was called the set time. The measurement was repeated and the average of at least two experimental values is reported. Agreement was generally within plus/minus 2% between identical samples.

Table II lists the set times of cements which were made from the magnesium oxides listed in Table I and which were prepared and tested according to the above procedure. Table II shows that the set times of the cements increased in all cases as a result of the heat treatment of the magnesium oxide.

TABLE II

SET TIMES OF A CEMENT FORMULATION MADE WITH SIX DIFFERENT, REFRACTORY GRADE, MAGNESIUM OXIDES

| | A | B | C | D | E | F |
|---|---|---|---|---|---|---|
| MgO untreated | 66 | 9.2 | 10.6 | 22.7 | 3.5 | 18.1 |
| Mgo heated* | 116 | 14.6 | 14.5 | 35.5 | 6.7 | 29 |

Set time reported in minutes
*Three hours at 935 plus/minus 15° C.

EXAMPLE 2

This example demonstrates that the prolonged set time can also be achieved for cements which are based on the reaction of magnesium oxide with ammoniumpolyphosphate which are described in U.S. Pat. No. 3,879,209 (Example VII). Measurement of the set time was carried out according to the procedure described in Example 1 except that the primary ingredients of the cement, magnesium oxide and ammoniumpolyphosphate (instead of magnesium oxide and aluminumphosphate) were combined in the ratios according to the disclosures of the cited patent:
   30 grams MgO B, Table I (10%)
   54 grams "SPS" (18%) (see below)
   75 grams fly ash, (Example 1) (25%)
   141 grams sand, (Example 1) (47%)

The Sequestered Phosphate Solution ("SPS") is a commercial fertilizer (50% ammoniumpolyphosphate dissolved in water) with approximately 34% $P_2O_5$ and 10% ammoniacal nitrogen.

The solid ingredients were blended, the liquid was added, the slurry mixed and the set time determined as described in Example 1. Set time was 7.2 minutes for the cement made with untreated magnesium oxide B and 17.3 minutes for cement made with magnesium oxide B after heat treatment as described in Example 1.

EXAMPLE 3

This example shows that the heat treatment of magnesium oxide also benefits the set time of cements which are based on magnesium oxide and the $NH_4H_2PO_4$ - $Na_4P_2O_7$ system as primary ingredients. Such cements are described in U.S. Pat. No. 4,152,167 (Example IV). As in Example 2, the ratio of the primary ingredients were chosen according to the disclosures in the cited patent:
   52.7 grams MgO B (Table I) (17.6%)
   5.4 grams $Na_4P_2O_7$ (EM Science) (1.8%)
   35.1 grams $NH_4H_2PO_4$ (EM Science) (11.7%)
   177.0 grams sand, (Example 1) (59.0%)
   29.7 grams water The solid ingredients were blended, water was added and the slurry was mixed as described in Example 1. The set time was 6.5 minutes for the cement made with untreated magnesium oxide B and 17.7 minutes for the cement made with magnesium oxide B after heat treatment as described in Example 1.

EXAMPLE 4

This example shows that heating of magnesium oxide such as B in Table I produces ironspinel. It also shows that the ironspinel diffuses during heating towards the surface of the individual magnesium oxide grains where it reaches its maximum concentration, and then its concentration decreases towards the center of the magnesium oxide grains.

In this example "$B_1$" designates MgO B (Table I) as received, "$B_2$" designates the same MgO B but which had been heated for three hours at 935 plus/minus 15° C. in a muffle furnace. X-ray diffraction (XRD) of sample $B_1$ identified periclase which contained Monticellite ($CaMgSiO_4$) and aluminumspinel ($MgAlO_4$) as impurities. Peak intensities showed the Monticellite 2.5 times more abundant than aluminumspinel. No iron mineral was detected in $B_1$. Since chemical analysis had shown that there was three times more Fe than Al in this magnesium oxide and since the XRD technique is more sensitive for Fe than Al, it can be concluded that Fe was present in $B_1$ in amorphous form.

XRD identified the major impurity in $B_2$ as ironspinel. By comparing peak intensities it was established that ironspinel had grown from non-detectable concentrations in $B_1$ to 1.3 times the concentration of Monticellite in $B_2$.

Ion Scattering Spectrometry (ISS) with 20 Ne+ ions permitted a comparison of the distribution of Fe present in samples $B_1$ and $B_2$ as a function of depth. 20 Ne+ ions penetrate the magnesium oxide surface to a depth of about 200 Angstroms. A comparison of the ISS spectra of $B_1$ and $B_2$ showed that Fe was 5.9 times more abundant near the surface of $B_2$ than in the surface of $B_1$. It also showed that the Fe concentration in $B_2$ gradually decreased towards the center of $B_2$. In $B_1$, however, the Fe concentration remained constant as a function of depth.

EXAMPLE 5

This example shows that heating of the magnesium oxide for three hours to 600° C. suffices to effect iron-spinel formation. Coarse aggregate was incorporated into the formulations of this example which is advantageous for applications such as pot hole patching, setting posts and casting panels. Formulations of this type preclude the use of a penetrometer to determine set time because the 1 mm diameter needle of this instrument could contact a pebble of the coarse aggretate in the cement paste and therefore give erroneous readings. Instead a "working time" was determined. It was defined as the period from liquid addition and continuing through mixing, placing and finishing to the time at which the cement no longer took a finish. The working time was generally reproducible within two minutes by the same experimenter.

The magnesium oxide used in this example was the magnesium oxide B in Table I. Six separate samples were heated for three hours to the temperatures reported in Table III before incorporation into the cement composition given below:

5 parts MgO A (Table I)
6.55 parts $Al(H_2PO_4)_3$
6.55 parts water
38.20 parts silica sand (ASTM C 33-84)
39.80 parts pea gravel (6 to 12 mm dia.)
3.90 parts fly ash (ASTM C 618-83, Class C)

TABLE III

| Temperature of Heating (degrees C.) | Working Time (min.) |
| --- | --- |
| 1150 | 13 |
| 920 | 12 |
| 800 | 12 |
| 700 | 11 |
| 600 | 10 |
| 500 | 6 |
| 25 | 5 |

EXAMPLE 6

This example shows that a heating duration of at least one hour at 935 plus/minus 15° C. is required to achieve the desired extension of working time of MgO/phosphate cements.

Samples of MgO B (Table I) were placed into a muffle furnace preheated to the temperatures given in Table IV below and kept there for the desired time. These MgO samples were then incorporated into the cement formulation given below.

5 parts MgO
6.5 parts $Al(H_2PO_4)_3 \cdot 3H_2O$
6.5 parts water
27 parts silica sand (ASTM C 33-84)
43 parts pea gravel (6 to 12 mm dia.)
12 parts fly ash (ASTM C 618-83, Class C)

The working time of these cements was determined as described in Example 5 and is recorded in Table IV.

TABLE IV

| Heating Time (hrs.) | Working Time (min.) |
| --- | --- |
| ½ | 10 |
| 1 | 12 |
| 2 | 13 |
| 3 | 13 |
| 7 | 13 |

I claim:

1. In a storable cement product containing (a) magnesium oxide particles and (b) an inorganic salt of phosphoric acid, components (a) and (b) being adapted to undergo a reaction in the presence of water and an aggregate to form a hard, cement product, the improvement comprising the use of magnesium oxide particles containing magnesium ferrate in a gradient concentration that increases to a maximum at the external particle surface.

2. A cement product of claim 1 wherein said phosphoric acid salt is aluminum phosphate.

3. A storable cement product comprised of from about 2 to 27 parts by weight of magnesium oxide particles containing magnesium ferrate in a gradient concentration that increases to a maximum on the external particle surface, from about 5 to 25 parts by weight of inorganic salt of a phosphoric acid and from about 40 to 90 parts by weight of aggregate.

4. In a rapid-setting composition comprising a mixture of magnesium oxide, a phosphoric acid salt, water and an aggregate, the improvement comprising magnesium oxide particles containing from about 0.1 to 7.5 percent by weight of magnesium ferrate in a gradient concentration that increases to a maximum at the external particle surface.

5. A composition of claim 4 wherein said phosphoric acid salt is aluminum phosphate.

6. A composition of claim 4 wherein said phosphoric acid salt is ammonium phosphate, sodium phosphate, ammonium polyphosphates, sodium polyphosphates or combinations thereof.

7. A composition of claim 6 containing sand, flyash, or gravel or a combination thereof.

* * * * *